C. NEER.
Dynamometer.
No. 61,237.
Patented Jan'y 15, 1867.
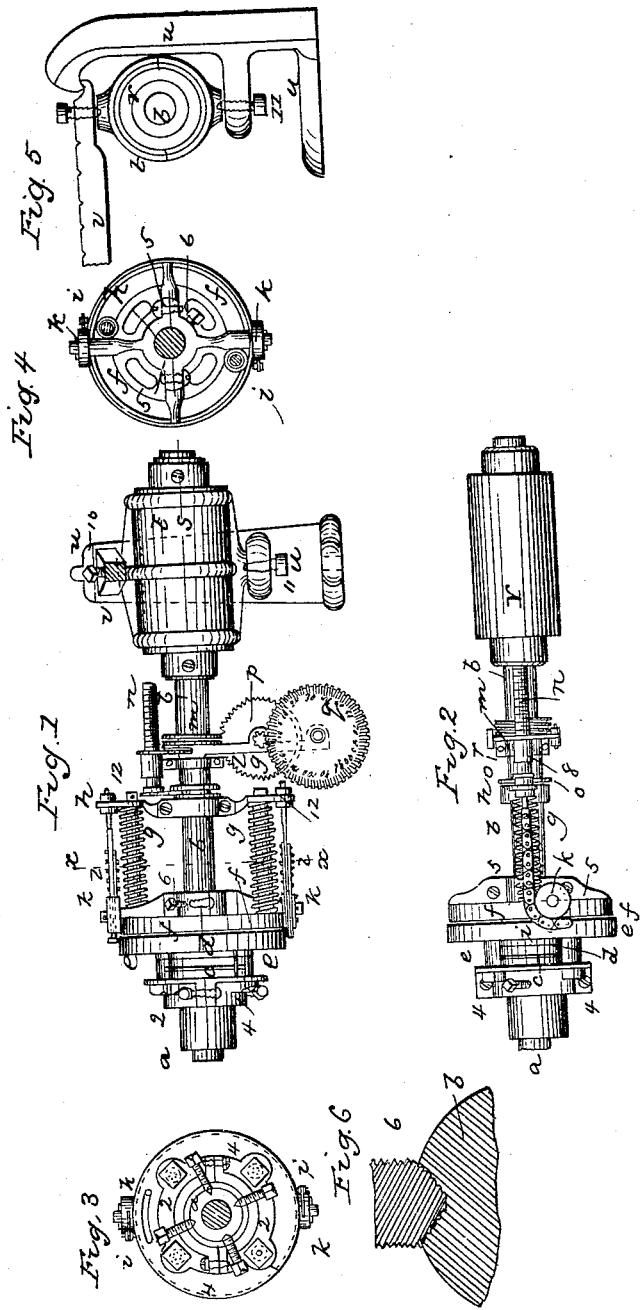
WITNESSES
Chas. H. Smith
Geo. D. Walker
INVENTOR
Charles Neer

United States Patent Office.

CHARLES NEER, OF BROOKLYN, NEW YORK.

*Letters Patent No. 61,237, dated January 15, 1867.*

---

IMPROVEMENT IN DYNAMOMETERS.

---

*The Schedule referred to in these Letters Patent and making part of the same.*

---

TO ALL WHOM IT MAY CONCERN:

Be it known that I, CHARLES NEER, of Brooklyn, in the county of Kings, and State of New York, have invented, made, and applied to use a certain new and useful Improvement in Dynamometers; and I do hereby declare the following to be a full, clear, and exact description of the said invention, reference being had to the annexed drawing, making part of this specification, wherein—

Figure 1 is a side elevation of my improved dynamometer and friction tester.

Figure 2 is a plan of the dynamometer.

Figure 3 is an end view of the perimetral power scale.

Figure 4 is a view sectionally at line $x\,x$; and

Figure 5 is a view endwise of the friction tester.

Similar marks of reference denote the same parts.

Dynamometers have heretofore been constructed with a view to determine the strain or power exerted, either to draw or to rotate any given article, but it has been very difficult to calculate, in the case of a revolving mechanism, the power consumed in nominal horse-power, because the extent of movement or distance travelled becomes an element in the calculation based upon the actual force exerted.

The nature of my said invention consists in a peripheral power scale, combined with a steel-yard or other measure of actual force, whereby the actual power exerted can be measured with accuracy, and the nominal horse-power be determined by inspection, and a calculation based upon the number of revolutions; and in this apparatus there is no liability of derangement of the parts by wear.

In the drawing, $a$ represents the portion of a shaft to which power is applied to rotate it; $b$ is a separate shaft on the same line; $c$ and $d$ are ordinary couplings, employed to connect $a$ and $b$. In this case the bolts usually introduced to connect the flanges of the coupling are removed, in order that the power applied to rotate $b$ may pass through my apparatus from the motor $a$. $e$ is my peripheral power scale, consisting of a wheel or segment of a wheel, whose circumference (or circle described by it) bears a given decimal proportion to one thousand feet, so that its rotation, an even number of tens or hundredth times, shall cause a point on said perimeter to travel one thousand feet, in order that the power may be computed with facility, as hereafter shown. The peripheral scale $e$ is attached to the coupling $c$, where that may be the most convenient, or, in many cases, it may more easily be attached to the side or hub of a wheel or pulley. I have shown said peripheral scale, $e$, attached by the columns 1, 1, ring 2, and set-screws 3 to the said coupling $c$, and I make said ring 2 and peripheral scale $e$ in two parts, connected together by screws, 4, 4, so that they can be attached around the shafting without the necessity of taking the shafting down. Adjacent to the peripheral scale $e$ is the steel-yard carrier $f$, made in two pieces attached together by bolts, 5, so that it may be placed around the shaft $b$, and secured thereto by set-screws, 6, so as to prevent the necessity of removing the shaft from its bearings for applying the dynamometer. The set-screws 5 and the screws 3 are to be formed at their points, as seen in fig. 6, with a series of cylindrical steps, which, entering the conical hole bored in the shaft or coupling, form a secure attachment, and the action of the power is not to drive out the screw and break the hub or wheel, as is the case with the conical or inclined point, because the edges of the cylindrical steps imbed themselves in the metal at the bottom of the conical hole, thus avoiding difficulties, heretofore experienced, of injury to the parts carrying the screw when under heavy strain. From the face of the steel-yard carrier $f$ project bars, 12, 12, around which the springs $g\,g$ are placed, and $h$ is the moving steel-yard head connected by chains, $i\,i$, passing around rollers $k\,k$ on $f$, and the ends of the chains $i\,i$ are attached to the peripheral power scale $e$. $l$ is a hanging frame, held in place by a ring in a groove in the collar $m$, which collar is divided for convenience of application around the shaft $b$, to which it is clamped by the screws 7. 8 is a socket on $l$, through which passes a rod, $n$, having divisions to indicate the horse-power, and a fork, $o$, at the end of this rod $n$ sets within a groove in the hub of the moving steel-yard head $h$. Around the collar $m$ is a single screw-thread or worm, taking the teeth of the wheel $p$, and moving them one tooth each revolution of the shaft $b$, and $q$ is a dial, driven by the pinion 9. On the dial $q$ are one hundred divisions, and the wheel $p$ and pinion 9 are to be such that the wheel $q$ will turn once in a minute when the shaft $b$ is running at the speed contemplated for the dynamometer. Suppose, for example, that the peripheral scale $e$ was of such a size that with four hundred and fifty times per minute a point thereon would travel one thousand feet, and that the strength of the steel-yard was such that it required thirty-three pounds to draw the rod $n$ through 8, to the point marked 1, then the power would be indicated 1,000 feet travel × 33 lbs.= 33,000 lbs. raised one foot, or a nominal horse-power. The steel-yard and divisions on $n$ are to be proportioned to the varying range of power, and the amount of power exerted to drive the shaft $b$ will be indicated by the divisions on the rod $n$.

If, from any cause, the speed of revolution of the shaft $b$ should vary from that contemplated by the dynamometer, the dial $q$ enables me to determine the difference of power resulting from the increase or decreased speed. The dial being proportioned to make one revolution per minute, if, upon timing it, there is found more than one revolution, then add to the horse-power indicated on $n$ the decimal of excess, and if less, then subtract the decimal from the horse-power indicated on $n$. This dynamometer being constructed of a size adapted to a given range of power, and the dial $q$, accompanying it, geared to indicate the contemplated speed for the horse-power marked on the rod $n$, the actual power consumed under any speed or strain within the capacity of the apparatus is determined by the simple calculation of adding to or subtracting from the horse-power indicated on $n$, according to the speed denoted by the dial $q$. In order to employ my apparatus in testing friction, I attach to the shaft $b$ a cylinder, $r$, and for convenience short shafts, $a$ $b$, may be mounted in a lathe. The boxes $s$ and $t$ are held in a frame, $u$, secured to the bed of the lathe, and the boxes $s$ and $t$ are adjusted by screws 10 and 11, so as to take a correct bearing upon the cylinder $r$, and the lever $v$, which carries the screw 10, is to be weighted. It will now be understood that the friction of running the cylinder $r$ within the boxes $s$ and $t$ may be actually measured by the power indicated upon the dynamometer, and the decrease of friction by oils and the various properties of lubricating materials, or of composition boxes or bearings, can be accurately tested by this apparatus, so as to determine the best lubricating material, the best composition for lining the bearings, or the frequency for lubrication may be determined with accuracy.

What I claim, and desire to secure by Letters Patent, is—

1. The peripheral power scale $e$, in combination with the chain $i$ and a steel-yard, or other measure of actual force, the parts being constructed and combined substantially as and for the purposes set forth.

2. I claim constructing the steel-yard carrier $f$ in two parts, so as to apply the dynamometer to a shaft without removing it from its bearings, substantially as set forth.

3. I claim the ring 2 and columns 1, in combination with the peripheral power scale $e$, for connecting the same to the coupling $c$, as set forth.

4. I claim the power indicator $n$ and fork 6, combined with the steel-yard head $h$, for the purposes and as set forth.

5. I claim the dial $q$, applied to indicate the proportion of speed, in combination with the indicator $n$, so as to determine the actual power consumed, substantially as set forth.

6. I claim the friction tester, consisting of the cylinder $r$ and boxes $s$ $t$, in combination with the dynamometer, substantially as and for the purposes set forth.

In witness whereof I have hereunto set my signature this second day of May, A. D. 1866.

CHARLES NEER.

Witnesses:
GEO. D. WALKER,
CHAS. H. SMITH.